No. 632,978. Patented Sept. 12, 1899.
E. S. WILLIAMS.
FLOWER POT.
(Application filed May 2, 1899.)
(No Model.)
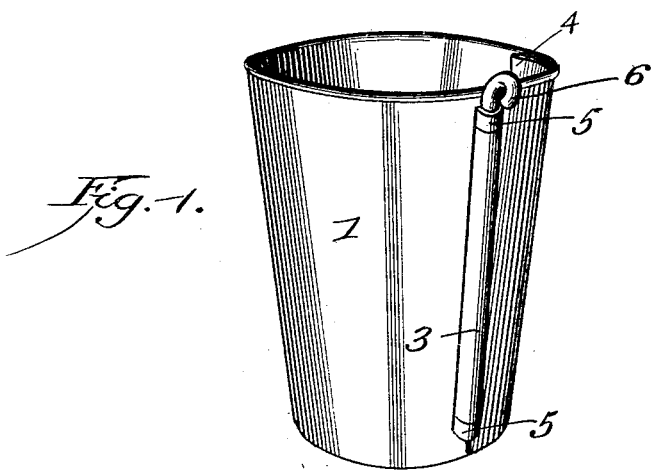
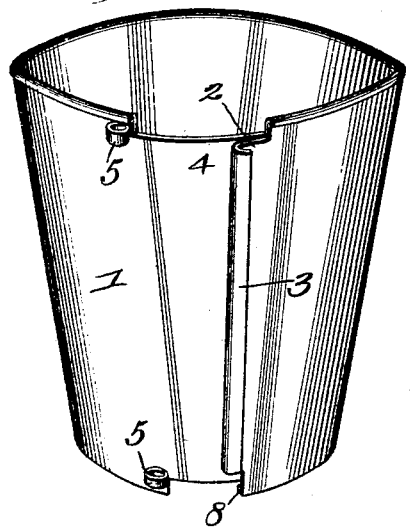
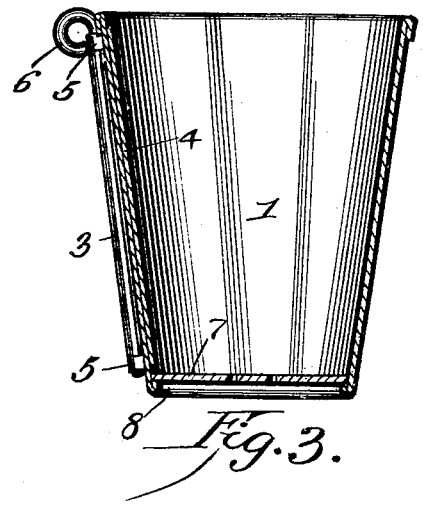
Inventor,
E. S. Williams.
Witnesses

UNITED STATES PATENT OFFICE.

ELLSWORTH S. WILLIAMS, OF FAIRMOUNT, KANSAS.

FLOWER-POT.

SPECIFICATION forming part of Letters Patent No. 632,978, dated September 12, 1899.

Application filed May 2, 1899. Serial No. 715,314. (No model.)

*To all whom it may concern:*

Be it known that I, ELLSWORTH S. WILLIAMS, a citizen of the United States, residing at Fairmount, in the county of Leavenworth and State of Kansas, have invented certain new and useful Improvements in Flower-Pots; and I do declare the following to be a full, clear, and exact description of the invention, such as will enable others skilled in the art to which it appertains to make and use the same.

The invention relates to flower-pots; and the object is to provide a device of this character by means of which the plants may be easily and quickly removed from the pot without danger of breaking the soil, which has assumed the shape of the pot, and without danger of injuring the roots of the plant.

With this object in view the invention consists in certain features of construction and combination of parts, which will be hereinafter more particularly described and claimed.

In the accompanying drawings the same reference characters indicate the same parts of the invention.

Figure 1 is a perspective view of my invention. Fig. 2 is a similar view, the securing-pin being removed and the overlapping ends of the pot separated; and Fig. 3 is a sectional view.

In the drawings, 1 denotes the body of the pot, which is made of a strip of sheet metal, one end of which is formed with a short tongue 2, which is bent to form a sleeve 3. The other end is provided with a much longer tongue 4, on one side of which and near the upper and lower end of the pot are provided eyes 5, adapted to aline with the sleeve, as shown in Figs. 1 and 3. When thus alined, a pin 6 is inserted through the eyes and the sleeves and holds the pot in the desired form. By referring to Fig. 3 it will be observed that the tongue 4 lies against the inner side of the pot and forms a broad joint, so that when the earth is packed within the pot it will force this tongue firmly against the inner side of the pot and prevent water from leaking out at that joint.

The pot is preferably tapering throughout its length and is provided with a removable bottom 7, which rests upon the base-flange 8 at the lower end of the pot.

As the plant grows it becomes necessary to repot it. The pin is withdrawn and the overlapping ends of the body of the pot are separated, thus freeing it from the soil surrounding the roots of the plant and permitting the plant, with its adhering soil, to be removed to another pot of larger dimensions. The ends of the pot are now brought together and locked by the pin and the bottom forced downward upon the flange at the lower end of the pot, and the pot is now in position to receive another plant.

From the foregoing description, taken in connection with the accompanying drawings, the construction, operation, and advantages of the invention will be readily understood without requiring an extended explanation.

The device is exceedingly simple, may be made at small cost, and is well adapted for the purpose for which it is designed.

Having thus fully described my invention, what I claim as new and useful, and desire to secure by Letters Patent of the United States, is—

A pot consisting of a single strip of sheet metal, one end of which is provided with a laterally-projecting tongue which is adapted to be overlapped by the other end of the strip, one end being provided with a sleeve and the other with alined eyes, said strip being bent into the form of a hollow truncated cone and provided with an internal annular base-flange, a pin inserted through said sleeve and eyes, and a removable bottom driven downward into the pot and upon the flange.

In testimony whereof I have hereunto set my hand in presence of two subscribing witnesses.

ELLSWORTH S. WILLIAMS.

Witnesses:
JOHN M. SINGER,
A. E. SIEGERS.